United States Patent [19]

Helver

[11] Patent Number: 5,600,951
[45] Date of Patent: Feb. 11, 1997

[54] HYDRAULIC TRANSMISSION SYSTEM

[76] Inventor: Oscar Helver, 13501 SW. 81st St., Miami, Fla. 33166

[21] Appl. No.: 415,437

[22] Filed: Apr. 3, 1995

Related U.S. Application Data

[63] Continuation-in-part of Ser. No. 270,377, Jul. 5, 1994, abandoned.

[51] Int. Cl.⁶ .............................. F16D 31/00; F01C 1/08
[52] U.S. Cl. .................. 60/325; 60/398; 418/191
[58] Field of Search ................. 60/325, 398; 418/191; 417/415

[56] References Cited

U.S. PATENT DOCUMENTS

| | | | |
|---|---|---|---|
| 3,117,562 | 1/1964 | Hajet | 418/191 |
| 3,218,984 | 11/1965 | Mosovsky | 418/191 |
| 3,237,613 | 3/1966 | Mosovsky | 418/191 X |
| 4,379,388 | 4/1983 | Williamson et al. | 60/325 X |
| 5,151,015 | 9/1992 | Bauer et al. | 417/415 |

*Primary Examiner*—Hoang Nguyen
*Attorney, Agent, or Firm*—Malloy & Malloy, P.A.

[57] ABSTRACT

A hydraulic transmission system including a hydraulic piston drivingly connected to a cam through a plunger shaft, the plunger shaft being connected to the cam through a lever arm such that rotation of the cam results in reciprocating movement of the plunger shaft between a withdrawn and an inserted position, fluid being drawn into a hydraulic chamber of the hydraulic piston upon pulled movement of the plunger shaft to the withdrawn position, and fluid being pushed out of the hydraulic piston upon pushed movement of the plunger shaft to the inserted position. Fluid exiting the hydraulic piston is directed into a turbine chamber so as to drivingly rotate a first and a second rotor matingly disposed therein. The first rotor includes a first plurality of tooth elements about a periphery thereof which define a first plurality of trough elements, and the second rotor includes a second plurality of trough elements disposed about a periphery thereof which define a second plurality of tooth elements. The tooth elements are sized to be matingly disposed in driving relation with the trough elements, at least one of which includes a radial channel extending inwardly therefrom and structured to contain a quantity of fluid that is alternatingly de-pressurized and re-pressurized, such that the fluid entering the turbine chamber and being re-pressurized in the channel will rotate the first and second rotors towards one another.

10 Claims, 2 Drawing Sheets

HYDRAULIC TRANSMISSION SYSTEM

The present is a continuation-in-part to a application filed Jul. 5, 1994 and assigned Ser. No. 08/270,377 now abandoned.

BACKGROUND OF THE INVENTION

1. Field of the Invention

The present invention relates to a hydraulic transmission system which utilizes fluid flow to provide an effective and efficient powering assembly which maximizes the forces of the fluid flow.

2. Description of the Related Art

Hydraulic transmission systems are frequently utilized to transmit the power necessary in a variety of situations. Generally, hydraulic transmission systems include centrifugal pumps which rotate, urging fluid therefrom, under pressure. These centrifugal pumps require some sort of external powering source to provide the internal rotation necessary to direct the fluid flow under pressure, and are often inefficient with regard to the quantity of water that can be emitted from the centrifugal pump relative to the amount of power that must be provided to the pump to cause the number of rotations. Generally, centrifugal pumps are connected with hydraulic turbines such that the water being emitted from the centrifugal pump will result in rotation of the turbines. The hydraulic turbines usually include conventional-type gears which are spaced from one another so as to enable proper rotation of a pair of gears which work with one another. This increased spacing, however, as well as the configuration of the gears themselves, results in an increased quantity of fluid being required to turn the gears. In particular, because of the spacing required, a relatively large amount of free space which must be filled with fluid is present.

Further, other gear assemblies, such as those disclosed in the references to Mosovsky (U.S. Pat. No. 3,218,984) and Amosov et al. (U.S. Pat. No. 3,692,441) do not maximize the rotational force exerted by the fluid. In configurations such as that of Amosov the area over which the fluid engages the gear is limited by the desire to maximize the contact of the gears with one another, while other embodiments, such as those of Mosovsky provide a variety of open passages such that the full force of the fluid is dissipated. In particular, it is the pushing force of the fluid which causes the gears to turn, accordingly it is this driving force that must be maximized.

Using these known combinations of centrifugal pumps and conventional hydraulic turbines, substantial amounts of energy must be provided to the system to provide the necessary volume of water which causes the gears to rotate and provide the drive necessary. As a result, it would be highly beneficial to provide an improved hydraulic transmission system which maximizes the effective use of fluid by providing maximum pressured fluid output, and minimizing the fluid requirements for gear rotation while maximizing a surface are of the gears that is driven by the fluid. The transmission system of the present invention is designed specifically to achieve these needs and provide an effective hydraulic transmission system.

SUMMARY OF THE INVENTION

The present invention is directed towards a hydraulic transmission system which utilizes a fluid, such as water therein, to transmit necessary powering. Initially, the hydraulic transmission system includes generator means which supply driving power to the system. Connected with the generator means is at least one cam which is turned as a result of the driving power supplied by the generator means.

Further, the hydraulic transmission system includes at least one hydraulic piston. The hydraulic piston includes a hydraulic chamber and a plunger shaft, the plunger shaft being structured to slidingly move in a reciprocating fashion within the hydraulic chamber. Specifically, the hydraulic chamber, which has a hollow interior, is divided into a generally elongate proximal chamber portion and a distal chamber portion, both of which are disposed in fluid flow communication with one another. The distal chamber portion has a fluid inlet and a fluid outlet wherethrough the hydraulic fluid to be utilized passes in and out of the hydraulic piston.

Disposed within the proximal chamber portion of the hydraulic chamber is the plunger shaft. The plunger shaft includes a plunger head and an elongate drive member extending from the plunger head. Specifically, the plunger head is slidingly positioned within the proximal chamber portion and a distal end of the elongate drive member protrudes from the proximal chamber portion such that slided movement thereof will result in corresponding slided movement of the plunger head.

Connected with the distal end of the elongate drive member is a lever arm. This lever arm, which includes a first end and a second end, is pivotally connected to the distal end of the elongate drive member at its first end, and is pivotally secured at its second end to the cam. Specifically, the lever arm is connected to the cam in such a manner that a rotated movement of the cam will result in reciprocating movement of the lever arm and accordingly reciprocating movement of the plunger shaft within the proximal chamber portion of the hydraulic chamber.

The plunger shaft is adapted to move between a substantially withdrawn position and a substantially inserted position. The plunger head of the plunger shaft is disposed to slidingly contact the proximal chamber portion of the hydraulic chamber in such a manner that upon pulled movement of the plunger shaft towards its substantially withdrawn position, fluid will be drawn into the hollow interior of the hydraulic chamber through the fluid inlet, thereby filling the hollow interior. Also, upon pushed movement of the plunger shaft towards its substantially inserted position, fluid will be pushed out of the hollow interior of the hydraulic chamber through the fluid outlet, thereby emptying the hollow interior. Accordingly, fluid is drawn from a fluid supply means through the fluid inlet and is urged out under pressure through the fluid outlet.

Also included as part of the hydraulic transmission system is a turbine chamber. The turbine chamber which has an open interior chamber and a fluid input opening is disposed relative to the hydraulic piston such that the fluid under pressure exiting the fluid outlet of the hydraulic piston will be directed into the interior chamber of the turbine chamber through its fluid input opening. Positioned within the interior chamber of the turbine chamber are a first rotor and a second rotor. These rotors are positioned in interlocking, driving relation with one another and are rotatably disposed relative to one another in substantially close, mating proximity with one another. In particular, the first rotor includes a first plurality of tooth elements disposed about a periphery thereof, the first plurality of tooth elements being positioned in closely spaced apart relation with one another so as to define a first plurality of trough elements therebetween. Similarly, the second rotor includes a second plurality of trough elements disposed about a periphery thereof in closely spaced apart relation from one another so as to define a second plurality of tooth elements. The first rotor and the second rotor are positioned relative to one another such that the first plurality of tooth elements of the first rotor are substantially received by the second plurality of trough elements of the second rotor so as to be drivingly engaged with one another and provide minimal spacing therebetween.

Defining the interior chamber of a rotor chamber which contains the first and second rotors is an interior wall surface. Specifically, this interior wall surface is disposed in substantially close, spaced relation with the first and second rotors such that the rotors will be allowed to freely rotate, yet the free space within the interior chamber of the turbine chamber will be minimized both due to the positioning of the interior wall surface relative to the rotors and the close proximity of the first rotor with the second rotor.

Positioned in fluid communication with the interior chamber of the turbine chamber is a fluid output opening. This fluid output opening is adapted to allow passage of fluid out of the interior chamber of the turbine chamber therethrough after the fluid has drivingly rotated the first and second rotors. Further, so as to maximize the driving force from the fluid, the second rotor includes at least one radial channel extending inward along a radius thereof from at least one of the second plurality of trough elements. The radial channel is structured and disposed to be filled with fluid upon an initial rotation of the second rotor such that a fluid contained therein will remain in the radial channel during subsequent rotations of the second rotor. As such, the fluid contained in the radial channels will immediately become re-pressurized upon initiation of further rotations so as to translate a rotating force from the fluid along an entire length of said radial channel.

Finally, the hydraulic transmission system includes power takeoff means which utilize the driving power resulting from the rotation of the first and second rotors.

It is an object of the present invention to provide a hydraulic transmission system which provides increased volume efficiency of pressurized fluid output which drives hydraulic rotors.

Still another object of the present invention is to provide a hydraulic transmission system which substantially minimizes free space contained within the turbine chamber which houses hydraulic rotors to be driven by pressurized fluid flow.

Yet another object of the present invention is to provide a hydraulic transmission system which maximizes the effects of driving power supplied to the system by an external source.

An additional object of the present invention is to maximize the surface area over which the driving power of the fluid effects the rotors.

BRIEF DESCRIPTION OF THE DRAWINGS

For a fuller understanding of the nature of the present invention, reference should be made to the following detailed description taken in connection with the accompanying drawings in which.

Like reference numerals refer to like parts throughout the several views of the drawings.

DETAILED DESCRIPTION OF THE PREFERRED EMBODIMENT

Shown throughout the figures, the present invention is directed towards a hydraulic transmission system, generally indicated as 10. The hydraulic transmission system 10 is structured to transmit power to a variety of machinery and engines.

Initially, the hydraulic transmission system 10 includes generator means 15 which supply driving power to the system. These generator means 15 can be any type of conventional generator means such as gas powered, solar powered, or electrical powered. Connected to these generator means 15, preferably through a drive shaft 16 of the generator means 15, is at least one cam 20. The cam 20, which is preferably rounded in shape, is connected to the generator means 15 such that the driven power supplied by the generator means 15 will turn the cam 20.

Figure 1:
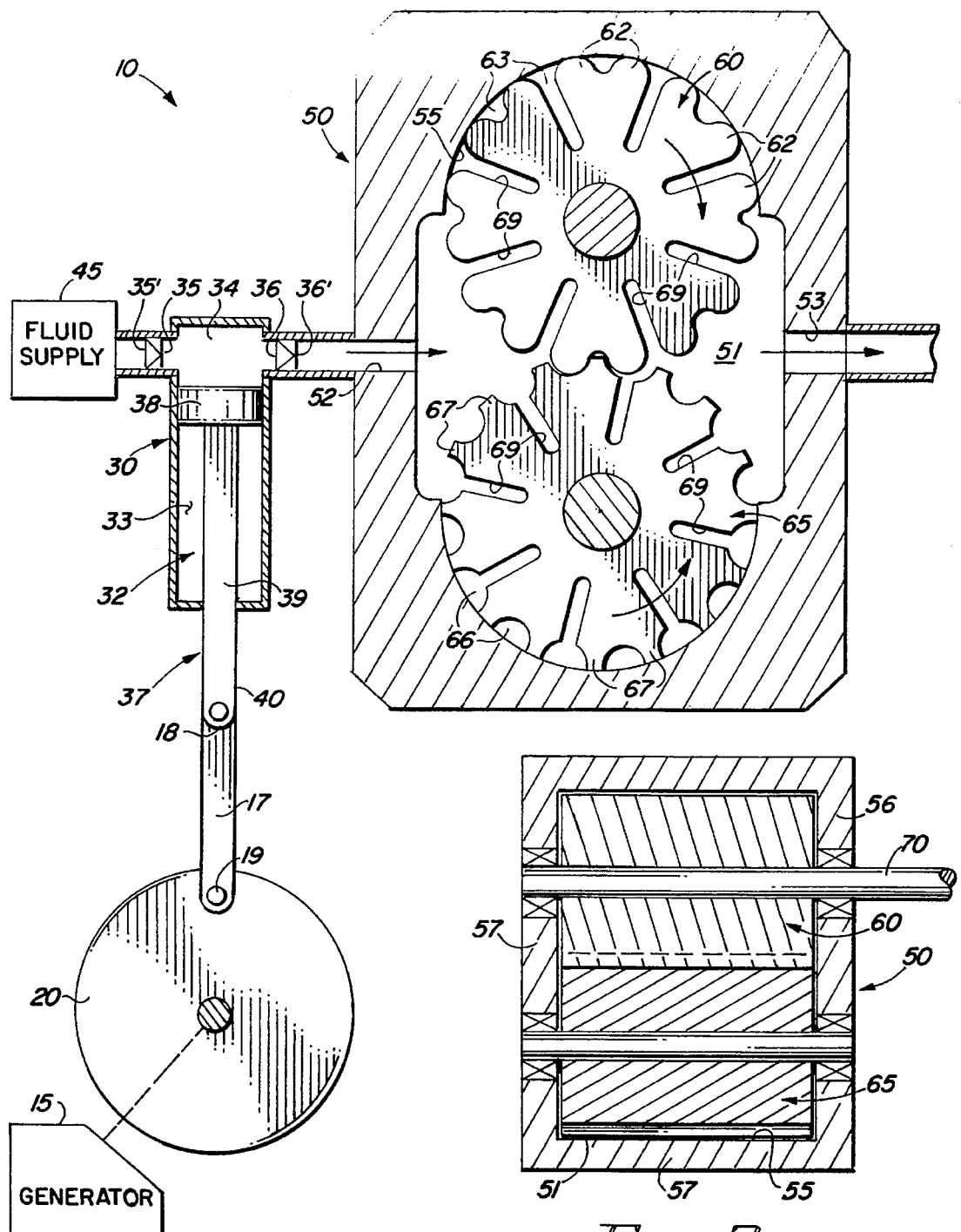
FIG. 1 is a top cross-sectional view of the transmission system of the present invention.
Figure 2:
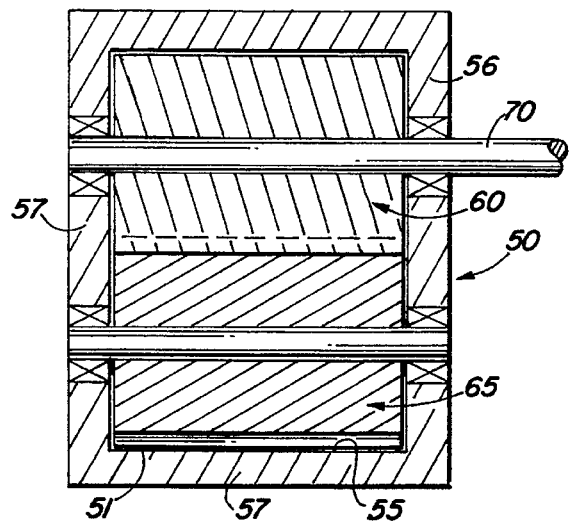
FIG. 2 is a side cross-sectional view of the turbine chamber of the present invention.
Figure 3:
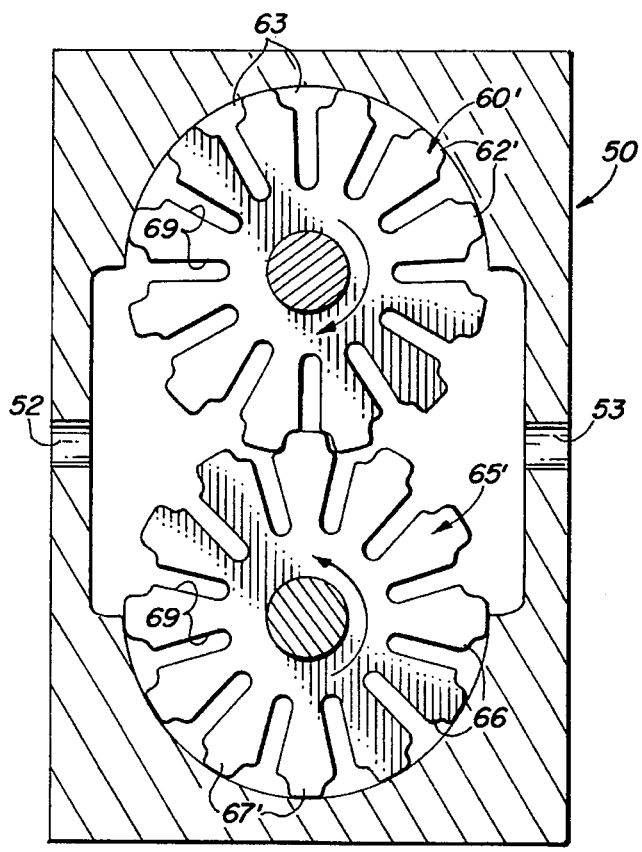
FIG. 3 is a top cross-sectional view of an alternative configuration of the transmission system of the present invention.
Figure 4:
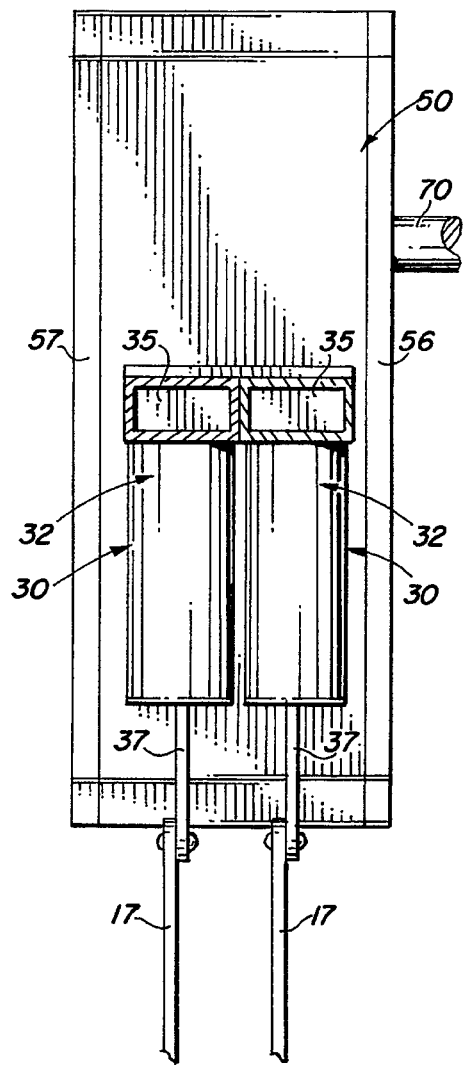
FIG. 4 is a side plan view of the transmission system of the present invention illustrating the use of two of the hydraulic pistons.

Drivingly connected to the cam 20 are fluid introduction means, preferably in the form of at least one hydraulic piston, generally indicated as 30. In particular, the hydraulic piston 30 will include a hydraulic chamber 32 and a plunger shaft 40 which slides in a reciprocating fashion within the hydraulic chamber 32. The hydraulic chamber 32, which has a hollow interior, is divided into a generally elongate proximal chamber portion 33 and a distal chamber portion 34. The proximal chamber portion 33 and distal chamber portion 34 are positioned in fluid flow communication with one another such that the hollow interior of the hydraulic chamber 32 throughout both the proximal chamber portion 33 and the distal chamber portion 34 can be utilized to contain hydraulic fluid. Disposed in the distal chamber portion 34 are a fluid inlet 35 and a fluid outlet 36. These fluid inlet 35 and fluid outlet 36 preferably will include one-way valves 35' and 36' thereon such that when fluid is drawn into the hydraulic chamber 32, it can only enter through the fluid inlet 35, and when fluid is pushed out of the hydraulic chamber 32, it will only be able to exit through the fluid outlet 36. Included as part of the plunger shaft 37 is a plunger head 38 and an elongate drive member 39 which extends from the plunger head 38. In particular, the plunger head 38 will be slidingly disposed within the proximal chamber portion 33 of the hydraulic chamber with 32 a distal end 40 of the elongate drive member protruding from an open end of the proximal chamber portion 33 of the hydraulic chamber 32. Accordingly, slided movement of the plunger shaft 37, and specifically the plunger head 38 within the proximal chamber portion 33 of the hydraulic chamber 32, will be achieved by pushing and pulling the elongate drive member 39 of the plunger shaft 37. Pivotally connected to the distal end 40 of the elongate drive member 39 is a lever arm 17. This lever arm 17, which has a first end 18 and a second end 19, is pivotally connected at its first end 18 to the distal end 40 of the elongate drive member 39. Further, the lever arm 17 is connected at its second end 19 to the cam 20. This second end 19 of the lever arm 17 is also pivotally connected to the cam 20 and is secured in such a manner that rotated movement of the cam 20 will result in reciprocating movement of the lever arm 17 and, accordingly, reciprocating movement of the plunger shaft 37 within the proximal chamber portion 33 of the hydraulic chamber 32. Movement of the plunger shaft 37 within the hydraulic chamber 32 will be between a substantially withdrawn position and a substantially inserted position. In order to achieve the appropriate fluid movement necessary, the plunger head 38 of the plunger shaft 37 will slidingly contact an inner surface of the proximal chamber portion 33 of the hydraulic chamber 32, and may include a gasket thereon. Accordingly, upon pulled movement of the plunger shaft 37 towards its substantially withdrawn position, a suction effect will occur and fluid will be drawn into the hollow interior of the hydraulic chamber 32 through the fluid inlet 35. Similarly, upon pushed movement of the plunger shaft 37 towards its substantially inserted position, the fluid will be pushed out of the hollow interior of the hydraulic chamber 32 through the fluid outlet 36. As a result, a single turn of the cam 20 will result in a complete stroke of the plunger shaft 37, the complete stroke including slided movement by the plunger shaft 37 to its substantially withdrawn position so as to fill the hollow interior of the hydraulic chamber 32, at both the proximal and distal chamber portions 33 & 34, followed by slided movement of the plunger shaft 37 to the substantially inserted position resulting in substantially complete evacuation of the fluid which had been drawn into the hollow interior of the hydraulic chamber 32. In the preferred embodiments, and as best seen in FIG. 4, two hydraulic pistons 30 are connected to the cam 20, additional hydraulic pistons 30 can be similarly connected to the cam 20, and also a plurality of cams 20 can be driven by the generator means 15, all of which will provide increased fluid output resulting from the driven power supplied by the generator means 15. In particular, in the preferred embodiment, two hydraulic pistons 30 will be connected to a single cam 20. Specifically, the lever arm 17 of each of the hydraulic pistons 30 will be connected spaced apart from one another, and preferably at opposite ends of the circular cam 20 such that during a rotation of the cam 20, one of the hydraulic pistons 30 will be drawing in fluid while simultaneously the second of the hydraulic pistons 30 will be emitting fluid. Further, by using both hydraulic pistons 30 connected to the single cam 20, the same amount of driving power supplied by the generator means 15 will result in twice the fluid volume being provided and will provide for a constant steady flow of fluid out of the hydraulic pistons 30.

Fluid supply means 45 are included to provide fluid to be drawn through the fluid inlet 35 of the hydraulic chamber 32 of each hydraulic piston 30. These fluid supply means 45 can merely include a fluid reservoir connected by tubing to the fluid inlet. Preferably, an air tight seal is provided such that the suction provided at the hydraulic piston 30 will be sufficient to draw fluid in through the fluid inlet in the hydraulic chamber of the hydraulic piston. Similarly, the fluid supply means 45 can include recirculated fluid such that fluid which has already exited the hydraulic pistons 30, can eventually be reused after its driving force has been utilized. Also, if mechanical force is required to provide the fluid to the hydraulic piston 30, the same generator means 15 and drive shaft 16 can be utilized to provide the fluid movement without requiring additional power supply to the system.

Connected in fluid flow communication with at least one and preferably both of the hydraulic pistons 30 is a turbine chamber 50. This turbine chamber 50 includes an interior chamber 51, a fluid input opening 52, and a fluid output opening 53, and will be completely sealed. In particular, the fluid input opening 52 of the turbine chamber 50 will be disposed in fluid flow communication with the fluid outlet 36 of each of the hydraulic chambers 32 such that the fluid being pushed out of the hydraulic chamber 32 will enter the interior chamber 51 of the turbine chamber 50 through this fluid input opening 52.

Positioned within the interior chamber 51 of the turbine chamber 50 are a first rotor 60 and a second rotor 65. This first rotor 60 and second rotor 65 are adapted to be positioned within the interior chamber 51 in mating, interlocking, driving relation with one another, and are disposed relative to one another so as to provide minimal free space within the interior chamber 51 of the turbine chamber 50. Specifically, the first rotor 60 will include a first plurality of tooth elements 62 disposed about a periphery thereof in closely spaced apart relation from one another. Preferably, these first plurality of tooth elements 62 will be semispherical or substantially rectangular protrusions which extend completely around the perimeter of the first rotor 60, thereby defining a first plurality of trough elements 63 there between. Similarly, the second rotor 65 includes a second plurality of trough elements 66 disposed about a periphery thereof in closely spaced apart relation with one another. These trough elements 66 are concave elements which are sized and structured specifically to matingly receive one of the first plurality of tooth elements 62 of the first rotor 60 therein and will define a second plurality of tooth elements 67 there between. Due to the mating, rounded edge shape of the tooth elements 62 & 67 and trough elements 63 & 66, both rotors will be able to be positioned in a substantially close position relative to one another, while still being able to turn, thereby substantially minimizing spacing between the first and second rotors 60 & 65 and working to reduce the amount of free space contained within the interior chamber 51. The interior chamber 51 of the turbine chamber 50 is defined by an interior wall surface 55 which extends completely around the first and second rotors 60 & 65. The interior wall surface 55 will be disposed in substantially close, spaced relation with the first rotor 60 and second rotor 65 so as to allow free rotation of the first and second rotors 60 & 65 within the interior chamber 51 of the turbine chamber 50, while substantially minimizing free space within the interior chamber 51 of the turbine chamber 50. It is beneficial to minimize the free space within the interior chamber 51 of the turbine chamber 50 so as to minimize the volume of fluid which will be required to drivingly rotate the first and second rotors 60 & 65. In particular, the first and second rotors 60 & 65 are positioned within the turbine chamber 50 in such a manner that the fluid which is pushed into the turbine chamber 50 through the fluid input opening 52 will be drivingly directed towards a contact point between the first and second rotors 60 & 65. Specifically, due to the position and orientation of the first and second rotors 60 & 65 within the interior chamber 51 of the turbine chamber 50, the fluid under pressure once urged into the interior chamber 51 through the fluid input opening 52 naturally travels outwardly, seeking free space, and resulting in driving, axial rotation of the first and second rotors 60 & 65 towards one another. As the fluid, which is seeking an exit from the interior chamber 51 of the turbine chamber 50, pushes outwardly, the rotors will rotate towards one another until finally the fluid arrives at the fluid output opening 53 of the turbine chamber 50 and can exit therethrough having effectively driven the rotors. This fluid, once exiting the turbine chamber 50, can be utilized with the fluid supply means 45 so as to recycle the same fluid and eliminate the need to constantly be supplying new fluid to the hydraulic transmission system 10.

Additionally, in the preferred embodiment, at least one, but preferably both the first and second rotors 60 & 65 will include at least one, but preferably a plurality of radial channels 69 extending inwardly at the trough elements 63 and 66. In certain embodiments, the radial channels can extend from alternating trough elements so as to preserve the structural integrity of the rotors, however, in the preferred embodiment one of the radial channels 69 will extend inwardly from each trough element 63 & 66. The radial channels 69 are disposed such that upon an initial turn of the rotors 60 & 65 they will be filled by a quantity of fluid. Accordingly, upon each radial channel 69 turning to the fluid output opening 53 of the turbine chamber 50 the fluid in the radial channels 69 will de-pressurize, but not exit the channels 69. As the de-pressurized channel 69 further turns to the fluid input opening 52, the high pressure fluid will immediately re-pressurize the fluid in the channels 69 without having to fill the channel 69. Due to the nature of fluid, upon re-pressurization the fluid drives the corresponding rotor along the entire radial length of the channel 69, thereby providing a substantially increased and efficient driving force. Further, because the individual channels are along a radial line of the rotor, the perpendicular driving force of the fluid along the length of the channel will be fully translated into rotation of the rotors. As such, the system 10 of the present invention provides increased operating efficiency over existing devices, and necessitates a smaller amount of start up torque. Also, given the efficiency and force translation effects, the length of each tooth element, and accordingly the depth of each trough element, can be reduced, thus requiring even less fluid to provide increased speed at the same torque.

Because preferably a plurality of hydraulic pistons 30 will be utilized to supply fluid into the turbine chamber 50, the turbine chamber 50 can be somewhat tall. In such a circumstance, the rotors themselves will also be somewhat tall, however, caps 56 & 57 must be secured to the top and bottom of the rotors, in the preferred embodiment, such that free space within the interior chamber 51 of the turbine chamber 50 will not exist between the turbine chamber 50 itself and a top or bottom of the rotors. Further, the fluid input opening 52 will be sized so as to receive fluid from any and all of the hydraulic pistons 30 utilized to provide fluid thereto. Finally, hydraulic takeoff means 70 can be connected with the first rotor 60 and/or second rotor 65 in order to utilize the driven power which has resulted from rotation of the rotors within the turbine chamber 50.

The present invention as recited indicates the preferred embodiment at the time of invention; however, variations or additions thereto which fall within the scope of the claimed invention as recited in claims and included under the doctrine of equivalents should also be included. Specifically, the claims as recited indicate a single pair of rotors and hydraulic pistons, however, multiple pairs may equivalently be utilized throughout this system. Further, the hydraulic fluid utilized, which is preferably water or oil, can be any appropriate hydraulic fluid, and the respective parts of the present invention can be formed of any conventional material such as steel or another metallic material, or even a hard plastic material. Similarly, gasket means may be utilized about the plunger head so as to provide the appropriate vacuum effect and also at the various fluid passages throughout the invention so as to maintain an appropriate seal and prevent leakage.

Now that the invention has been described,
What is claimed is:
1. A hydraulic transmission system comprising:

fluid introduction means structured and disposed to supply fluid under pressure, a turbine chamber, said turbine chamber including a fluid input opening disposed in fluid flow communication with said fluid introduction means such that fluid being supplied by said fluid introduction means will enter said turbine chamber through said fluid input opening, a first rotor and a second rotor disposed within said turbine chamber in interlocking, driving relation with one another, said first rotor including a first plurality of tooth elements disposed about a periphery thereof in closely spaced relation with one another so as to define a first plurality of trough sections therebetween, said second rotor including a second plurality of trough elements disposed about a periphery thereof in closely spaced relation with one another so as to define a second plurality of tooth elements, each of said second plurality of trough elements being structured to substantially receive one of said first plurality of tooth elements drivingly and matingly therein, said first rotor and said second rotor being rotatably disposed within said turbine chamber in substantially close, mating proximity with one another such that said first plurality of tooth elements of said first rotor are matingly and drivingly disposed relative to said plurality of second trough elements of said second rotor and said second plurality of tooth elements of said second rotor are matingly and drivingly disposed relative to said plurality of first trough elements of said first rotor, said first rotor and said second rotor being disposed within said turbine chamber such that said fluid being pushed into said turbine chamber through said fluid input opening is drivingly directed to said first rotor and said second rotor so as to result in driving rotation of said first rotor and said second rotor towards one another, said second rotor including at least one radial channel extending inward along a radius of said second rotor from at least one of said second plurality of trough elements, said radial channel being structured and disposed to be filled with fluid upon an initial rotation of said second rotor such that a fluid contained therein will remain in said radial channel during subsequent rotations of said second rotor and will immediately become re-pressurized upon initiation of further rotations so as to translate a rotating force from said fluid along an entire length of said radial channel, said first rotor including at least one radial channel extending inward along a radius of said first rotor from at least one of said first plurality of trough elements, said radial channel being structured and disposed to be filled with fluid upon an initial rotation of said first rotor such that a fluid contained therein will remain in said radial channel during subsequent rotations of said first rotor and will immediately become re-pressurized, upon initiation of further rotations, so as to translate a rotating force from said fluid along an entire length of said radial channel, said turbine chamber being structured to allow free rotation of said first rotor and said second rotor therein, while substantially minimizing free space therein around said first and said second rotors, a fluid output opening disposed in said turbine chamber and being structured and disposed to allow passage of said fluid out of said turbine chamber and de-pressurization of said fluid that remains contained in said radial channel, subsequent to said fluid having drivingly rotated said first rotor and said second rotor, and power take off means structured and disposed to utilize driving power resulting from rotation of said first rotor and said second rotor.

2. A hydraulic transmission system as recited in claim 1 wherein said turbine chamber includes an interior chamber, wherein said first rotor and said second rotor are rotatingly contained, said interior chamber of said turbine chamber being defined by an interior wall surface of said turbine chamber which is disposed in substantially close spaced relation with said first rotor and said second rotor so as to allow free rotation of said first rotor and said second rotor within said interior chamber of said turbine chamber and to substantially minimize free space within said interior chamber of said turbine chamber.

3. A hydraulic transmission system as recited in claim 2 wherein said fluid introduction means includes at least one hydraulic piston.

4. A hydraulic transmission system as recited in claim 3 wherein said at least one hydraulic piston is drivingly connected to a cam such that rotating movement of said cam results in reciprocating movement of a plunger shaft within said hydraulic piston and accordingly results in fluid being drawn into said hydraulic piston and subsequently being pushed out of said hydraulic piston into said fluid input opening of said turbine chamber, upon a rotation of said cam.

5. A hydraulic transmission system as recited in claim 1 including a plurality of said radial channels disposed in said first and said second rotors.

6. A hydraulic transmission system comprising:

generator means structured and disposed to supply driving power, a cam drivingly connected to said generator means such that said driving power supplied by said generator means turns said cam, at least one hydraulic piston, said hydraulic piston including a hydraulic chamber and a plunger shaft structured for reciprocating, sliding movement within said hydraulic chamber, said hydraulic chamber including a hollow interior, and having a generally elongate proximal chamber portion and a distal chamber portion disposed in fluid flow communication with said proximal chamber portion, said distal chamber portion including a fluid inlet and a fluid outlet, said plunger shaft including a plunger head and an elongate drive member extending from said plunger head, said plunger head being slidingly disposed within said proximal chamber portion of said hydraulic chamber such that a distal end of said elongate drive member protrudes from said proximal chamber portion of said hydraulic chamber, said distal end of said elongated drive member being pivotally connected to a first end of a lever arm, said lever arm including said first end and a second end, said second end of said lever arm being pivotally secured to said cam such that rotated movement of said cam results in reciprocating movement of said lever arm and accordingly reciprocated movement of said plunger shaft within said proximal chamber portion of said hydraulic chamber between a substantially withdrawn position and a substantially inserted position, said plunger head of said plunger shaft slidingly contacting said proximal chamber portion of said hydraulic chamber such that upon pulled movement of said plunger shaft towards said substantially withdrawn position fluid is drawn into said hollow interior of said hydraulic chamber through said fluid inlet and upon pushed movement of said plunger shaft towards said substantially inserted position fluid is pushed out of said hollow interior of said hydraulic chamber through said fluid outlet, fluid supply means structured and disposed to provide fluid to be drawn through said fluid inlet of said hydraulic chamber, a turbine chamber, said turbine chamber including an interior chamber and a fluid input opening disposed in fluid flow communication with said fluid outlet of said hydraulic chamber such that fluid being pushed out of said hydraulic chamber will enter said interior chamber of said turbine chamber through said fluid input opening, a first rotor and a second rotor disposed within said turbine chamber in interlocking, driving relation with one another, said first rotor including a first plurality of tooth elements disposed about a periphery thereof in closely spaced relation with one another so as to define a first plurality of trough sections therebetween, said second rotor including a second plurality of trough elements disposed about a periphery thereof in closely spaced relation with one another so as to define a second plurality of tooth elements, each of said second plurality of trough elements being structured to substantially receive one of said first plurality of tooth elements drivingly and matingly therein, said first rotor and said second rotor being rotatably disposed within said interior chamber of said turbine chamber in substantially close, mating proximity with one another such that said first plurality of tooth elements of said first rotor are matingly and drivingly disposed relative to said plurality of second trough elements of said second rotor and said second plurality of tooth elements of said second rotor are matingly and drivingly disposed relative to said plurality of first trough elements of said first rotor, said first rotor and said second rotor being disposed within said turbine chamber such that said fluid being pushed into said turbine chamber through said fluid input opening is drivingly directed to said first rotor and said second rotor so as to result in driving rotation of said first rotor and said second rotor towards one another, said second rotor including at least one radial channel extending inward along a radius of said second rotor from at least one of said second plurality of trough elements, said radial channel being structured and disposed to be filled with fluid upon an initial rotation of said second rotor such that a fluid contained therein will remain in said radial channel during subsequent rotations of said second rotor and will immediately become re-pressurized upon initiation of further rotations so as to translate a rotating force from said fluid along an entire length of said radial channel, said first rotor including at least one radial channel extending inward along a radius of said first rotor from at least one of said first plurality of trough elements, said radial channel being structured and disposed to be filled with fluid upon an initial rotation of said first rotor such that a fluid contained therein will remain in said radial channel during subsequent rotations of said first rotor and will immediately become re-pressurized upon initiation of further rotations so as to translate a rotating force from said fluid along an entire length of said radial channel, said interior chamber of said turbine chamber being defined by an interior wall surface of said turbine chamber, said interior wall surface being disposed in substantially close spaced relation with said first rotor and said second rotor so as to allow free rotation of said first rotor and said second rotor within said interior chamber of said turbine chamber and to substantially minimize free space within said interior chamber of said turbine chamber, a fluid output opening disposed in said turbine chamber and being structured and disposed to allow passage of said fluid out of said interior chamber of said turbine chamber and de-pressurization of said fluid that remains contained in said radial channel, subsequent to said fluid having drivingly rotated said first rotor and said second rotor, and power take off means structured and disposed to utilize driving power resulting from rotation of said first rotor and said second rotor.

7. A hydraulic transmission system as recited in claim 6 wherein said fluid inlet of said hydraulic chamber includes a one-way valve thereon structured to allow fluid to be drawn into the hydraulic chamber therethrough but not exit the hydraulic chamber therethrough.

8. A hydraulic transmission system as recited in claim 7 wherein said fluid outlet includes a one-way valve structured to allow fluid to be pushed therethrough out of said hydraulic chamber, but not drawn therethrough into the hydraulic chamber.

9. A hydraulic transmission system as recited in claim 8 including two of said hydraulic pistons, each of said hydraulic pistons including one of said lever arms secured to said cam.

10. A hydraulic transmission system as recited in claim 6 including a plurality of said radial channels disposed in said first and said second rotors.

* * * * *